United States Patent
Weipert et al.

(10) Patent No.: US 7,271,211 B2
(45) Date of Patent: *Sep. 18, 2007

(54) DISPERSIONS CONTAINING FATTY ACID ESTERS OF STYRENATED PHENOL ALKOXYLATES

(75) Inventors: Paul David Weipert, High Point, NC (US); Edward R. Godwin, Davidson, NC (US); Richard Walton, Simpsonville, SC (US)

(73) Assignee: Ethox Chemicals, LLC, Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/168,333

(22) Filed: Jun. 29, 2005

(65) Prior Publication Data

US 2005/0235877 A1  Oct. 27, 2005

Related U.S. Application Data

(63) Continuation-in-part of application No. 11/013,785, filed on Dec. 17, 2004.

(60) Provisional application No. 60/529,755, filed on Dec. 17, 2003.

(51) Int. Cl.
*C08K 5/10* (2006.01)
(52) U.S. Cl. ............ 524/366; 524/315; 524/317; 524/322; 524/299; 524/378
(58) Field of Classification Search ........... 524/366, 524/299, 348, 322, 317; 525/403, 88
See application file for complete search history.

(56) References Cited

U.S. PATENT DOCUMENTS

| | | | |
|---|---|---|---|
| 4,459,185 A * | 7/1984 | Obata et al. ............ 205/254 |
| 5,227,402 A * | 7/1993 | Rochling et al. ......... 514/521 |
| 5,651,861 A * | 7/1997 | Larson et al. ........... 162/5 |
| 5,770,760 A * | 6/1998 | Robinson ............... 560/221 |
| 6,057,398 A * | 5/2000 | Blum ................... 524/507 |
| 6,375,969 B1 * | 4/2002 | Kostka et al. ........... 424/409 |
| 6,478,866 B1 * | 11/2002 | Nyssen et al. .......... 106/503 |
| 6,736,892 B2 * | 5/2004 | Godwin et al. .......... 106/499 |

FOREIGN PATENT DOCUMENTS

| | | | |
|---|---|---|---|
| JP | 61-213273 A | * | 9/1986 |
| JP | 10-95946 A | * | 4/1998 |
| JP | 11-124791 A | * | 5/1999 |

\* cited by examiner

*Primary Examiner*—David W. Wu
*Assistant Examiner*—Rip A. Lee
(74) *Attorney, Agent, or Firm*—Isaac A. Angres

(57) ABSTRACT

The present invention provides a dispersant for aqueous and non-aqueous systems which can disperse insoluble fine powders in non-aqueous liquids in a short period of time and give long-term dispersion stability to the resulting dispersions without allowing the formation of hard cake or precipitates. The dispersant is a compound of the formula

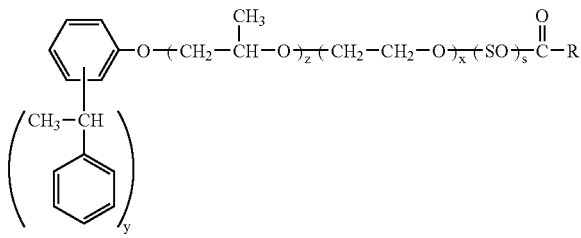

wherein SO is styrene oxide; R is a $C_8$-$C_{22}$ saturated or unsaturated group; x=0-100; y=1-3; z=0-100 and s=0-100. The dispersant of the invention is also particularly effective for dispersing additives into polymers such as polyesters, polyamides, polycarbonates, polyethylene and polypropylene.

10 Claims, No Drawings

DISPERSIONS CONTAINING FATTY ACID ESTERS OF STYRENATED PHENOL ALKOXYLATES

This application is a continuation-in-part of U.S. application Ser. No. 11/013,785 filed Dec. 17, 2004 now U.S. Pat. No. 7,205,352, which is in its entirety herein incorporated by reference. This application also claims the priority benefit under 35 U.S.C. section 119 of U.S. provisional application Ser. No. 60/529,755 entitled "Pigment Dispersions Containing Fatty Acid Esters Of Styrenated Phenol Alkoxylates" filed Dec. 17, 2003, which is in its entirety herein incorporated by reference.

FIELD OF INVENTION

This invention relates to new and useful non-aqueous liquid pigment dispersions which are easy to handle and produce thorough and effective colorations within target media, particularly as compared to standard solid pigments or high-viscosity liquid pigment dispersions.

This invention relates to a class of dispersants for non-aqueous systems which can disperse pigments in non-aqueous liquids within a short period of time and thereby give dispersions showing good dispersion stability for a prolonged period of time.

The present invention also pertains to a process of preparing aqueous and non-aqueous dispersions containing a pigment uniformly distributed throughout. In particular, the invention relates to a process of dispersing a pigment in a non-aqueous system with fatty acid esters of styrenated phenol ethoxylates. The invention is also directed to non-aqueous pigment dispersions containing organic pigments and surfactants based on fatty acid esters of styrenated phenol alkoxylates and fatty acid esters of styrenated bisphenol alkoxylates. The dispersions are produced by dispersing the pigment and the other constituents in an organic solvent, using bead mills and ultrasonic mills. The non-aqueous organic pigment dispersions can be used in many applications such as paints, colored plastisols, nail polish compositions, printing inks including ink-jet inks or writing inks.

The present invention also relates to pigment dispersions in organic solvents and containing a fatty acid ester of a styrenated phenol alkoxylate and fatty acid ester of a styrenated bisphenol alkoxylate as dispersing agent. The pigment dispersion can be used in paints based on organic solvents.

The present invention also provides pigment dispersions in organic solvents and which, without causing flocculations which may cause unacceptable differences in color, may be used in organic solvent based paints.

This invention also relates to pigment dispersions suitable for pigmenting hydrophilic as well as hydrophobic media. The present invention further relates to methods of preparing inorganic pigment dispersions useful in the manufacture of paints, and paints prepared therewith.

Furthermore, the invention relates to dispersants which, when pigments insoluble in organic liquids are dispersed in said organic liquids in the presence thereof, can provide dispersions particularly excellent in flowability and dispersion stability.

The present invention also relates to a pigment dispersion suitable for preparation of coating compositions wherein a pigment is finely and stably dispersed in a high concentration in a non-aqueous solvent for applications in industrial fields of inks, paints, pigmented photoresists and the like, and particularly suitable for preparation of an offset printing ink composition which is excellent both in the pigment dispersibility and in the printability. The present invention further relates to an offset printing ink composition using the pigment dispersion.

The instant invention also provides nail polish and nail lackers containing the pigment dispersions of the invention.

The invention also relates to dispersing agents for mineral and/or organic fillers in resins intended to undergo transformation in a cold or hot state.

The present invention also relates to dispersing agents based on a fatty acid ester of a styrenated phenol alkoxylate and fatty acid ester of a styrenated bisphenol alkoxylate useful for dispersing mineral and/or organic fillers in thermoplastic and/or thermosetting materials, and to polymer compositions which are flowable and homogeneous (i.e., well mixed) and have a high filler content.

The invention further relates to thermoplastic and/or thermosetting polymer compositions, or polymer compositions transformable at low or high temperature, which are flowable and homogeneous, have a high filler content, and comprise one or more of the above-described dispersants.

Finally, the invention also relates to the use of the described dispersing agents and polymer compositions in the manufacture of plastic materials.

BACKGROUND OF THE INVENTION

The introduction of solids into liquid media requires high mechanical forces. This depends substantially on the wettability of the solid by the surrounding medium and on the affinity to this medium. For the purposes of reducing these dispersing forces it is conventional to use dispersants facilitating the dispersion. These are mostly surfactants or tensides having an anionic, cationic or a non-ionic structure. These agents are directly applied to the solid or added to the dispersing medium in relatively small amounts.

It is further known that these solids tend to flocculate following the dispersion, which nullifies the work earlier done and leads to serious problems. These problems have been accounted for by the London/van der Waal's forces by which the solids attract each other. For the purposes of counteracting these attractive forces absorption layers must be applied to the solid. This is done by using such tensides.

During and following the dispersion there is an interaction between the surrounding medium and the solid particle, resulting in a desorption of the tenside by exchange for the surrounding medium present in a higher concentration. This medium, however, is not capable in most cases of building up such stable absorption layers, resulting in a crash of the whole system. This becomes apparent by the increase in viscosity in liquid systems, losses of gloss and color shifts in lacquers and coatings as well as insufficient color force development in pigmented synthetics.

To solve this problem, e.g., EP-A 154,678, EP-A 74080, U.S. Pat. No. 4,032,698 and DE-A 24 38 414 propose the use dispersants. These dispersants, however, only lead to a partial solution, particularly with respect to the miscibility without flocculation of different pigments with each other, such as organic pigments and inorganic pigments. Moreover, the pigment pastes prepared by the methods defined tend to interact with the surrounding medium, e.g., after use in lacquers. Consequently, it can be assumed that the absorption layers built up only have insufficient stability against desorption. A number of dispersants proposed in these publications further have the drawback that the storage stability is too poor, which leads to precipitation, phase separation, crystallization, etc. This results in that such products are inhomogeneous and useless in practice after a relatively short time.

It is also known that pigments are widely used as colorants, for example, in paints, varnishes, and inks. Such pigments generally have average particle sizes (diameters) in the range of 0.1 to 10 micrometers, more typically, 1 micrometer or greater. To achieve these particle sizes, mechanical devices are most often used to comminute solid particulate into smaller primary particles. The most common mechanical devices include ball mills, attritors, sand/bead mills, and roll mills. All of these devices require moving parts in order to generate the mechanical forces required to break up the pigment particles. Milling times of several hours are typical, with certain pigments requiring a day or longer in order to break up, or comminute, the particles. Moreover, comminution of the pigment by contact with the milling media results in pigment surfaces exhibiting a high number of surface asperities. Furthermore, contamination of the dispersions from the mechanical parts of the milling equipment can result due to the intimate contact of the pigment with the milling media. Silicon dioxide, a grinding medium, is a common contaminant found after sand milling, for example.

Another disadvantage of mechanical processing of pigments is the large breadth of distribution of particle sizes resulting from such processes. This results in the presence of particles having diameters of one micrometer or greater, even in dispersions where the average particle size is significantly less. For dispersions requiring transparency in the final article, these larger particles lead to unwanted light scattering and are detrimental. The presence of these micrometer sized particles also leads to inherent instability, or tendency to flocculate, in the dispersions.

More stable pigment dispersions can be obtained by chemically altering the pigment. This often results in smaller average particle diameters but has the disadvantages of requiring a chemical pretreatment of the pigment, still requiring mechanical milling, and still providing a dispersion having a wide particle size distribution.

Current pigment dispersants are effective to some degree in dispersing a pigment in a higher concentration in a non-aqueous dispersion medium and in stabilizing the dispersion, but do not offer a satisfactory effect on stabilization of a fine dispersion of the pigment.

The products commonly employed in the prior art i.e, carbon black dispersants in coatings are salts of an acrylic acid copolymer, acetylenic diol surfactants, or polyalcohol ethers which fit into various classes of wetting and dispersing agents, (Calbo, Handbook of Coatings Additives, Dekker pg. 516). Such additives could be called on to function as more than a dispersant and can also act in one or more of the following ways: a) to prevent flocculation, b) to prevent hard settling, c) to improve jetness/color/gloss, d) to control viscosity, and/or e) to improve wetting of the base resin.

Various considerations are important in determining the usefulness of any additive as a dispersing agent for use with a carbon black or with other pigments, depending upon the product into which such a dispersion is to be incorporated. When used throughout this application the terms pigment(s) or pigment dispersion(s) are intended to encompass various materials which may be intended to impart either color and/or serve some other function, such as for example the use of carbon black in rubber where, in addition to adding color, such also acts as a reinforcing agent.

One of the most important considerations in determining whether a particular dispersant will be useful for use with a given pigment or pigments when such a pigment is to be used in a paint or coating composition is whether such a dispersant/pigment combination will or will not impart a conductive nature or characteristic to the dried paint film or coating into which it has been added.

The automotive industry is replacing and will continue to replace exterior metal body panels on vehicles with plastic and composite body panels. Some reasons for this change are weight reduction, flexibility of design, and lower tooling costs. The replacement of metal body panels by plastics and composites is not without difficulties.

One problem of note is the electrostatic spray painting of plastics. Electrostatic spray painting is the preferred manner of applying automotive topcoats. Spray painting normally gives the best appearance to the vehicle and the electrostatic technique assures the most economical use of the material. The problem arises because plastics do not paint well electrostatically unless a conductive primer is used.

Amongst the most important considerations for determining the utility of any dispersant to be used in conjunction with conductive carbon blacks are the following: the inherent rheological stability of the dispersion, both alone and when added to a formulated paint; resistance to flocculation of the carbon black/dispersant mixture and in the final paint or coating; and ability to achieve low viscosity at high pigment loadings.

The various prior art references of which the applicants are aware which relate to dispersing agents for pigment additives, such as carbon blacks, suffer from a number of shortcomings. The most significant shortcomings of the carbon black dispersants of the prior art, including those used for conductive carbon blacks, are: high levels of dispersant may be required which tends to detrimentally affect the physical properties of formulated paints, such as adversely affecting the resultant humidity resistance, yellowing upon exposure to UV light, loss of cure in melamine cross-linked systems, and other undesirable effects; inability to prevent reflocculation of carbon black, resulting in the loss of electrical conductivity in dried paint films; and incompatibility of the dispersant with the particular resin system selected for use in the final paint formulation.

Additionally, more and more paints are produced which are water-based and completely free from organic solvents, such as glycol ethers. When toning these paints to the desired colour, use is made to a great extent of pigment dispersions, which can be used both for water-based paint and for paint based on organic solvents. The pigment dispersions are normally composed of pigments, fillers, dispersing agents and an aqueous phase in the form of ethylene glycol, di- and triethylene glycol, propylene glycol, dipropylene glycol, tripropylene glycol and glycerol. In most cases, the dispersing agent is a nonionic surface-active compound or a combination of nonionic and anionic surfactants. For environmental reasons, it is however desirable that the pigment dispersions are solvent-free.

The shortcomings of the prior art dispersing agents noted above may be overcome by employing certain sulfated and/or carboxymethylated styrenated phenol alkoxylates in accordance with the present invention.

OBJECTS OF THE INVENTION

It is a first object of the present invention to provide novel pigment dispersions incorporating novel surfactants.

It is another object of the instant invention to provide novel pigment dispersions containing surfactants based on fatty acid esters of styrenated phenol alkoxylates and/or fatty acid esters of styrenated bisphenol alkoxylates.

A further object of the invention is to provide novel carbon black dispersions containing novel surfactants.

A still further object of the invention is to provide novel carbon black dispersions incorporating fatty acid esters of styrenated phenol alkoxylates and/or fatty acid esters of styrenated bisphenol alkoxylates.

An additional object of the invention is to provide novel non-aqueous pigment dispersions incorporating fatty acid esters of styrenated phenol alkoxylates and/or fatty acid esters of styrenated bisphenol alkoxylates.

A still further object of the invention is to provide non-aqueous carbon black dispersions containing surfactants based on fatty acid esters of styrenated phenol alkoxylates and fatty acid esters of styrenated bisphenol alkoxylates.

An additional object of the present invention is mixtures of fatty acid esters of styrenated phenol alkoxylates and fatty acid esters of styrenated bisphenol alkoxylates.

Still, another object of the invention are pigment dispersions having a very high tinctorial strength and brilliance, an excellent levelness and covering power in opaque applications.

A further object of the invention is to provide thermoplastic and/or thermosetting polymer compositions, or polymer compositions transformable at low or high temperature, which are the basis for plastics materials with improved physical and chemical properties such as mechanical, thermal, dielectric, and esthetic properties comprising at least one dispersing agent.

These and other objects of the present invention will more readily become apparent from the description and examples which follow.

SUMMARY OF THE INVENTION

The present invention is directed to a pigment dispersion comprising: (a) a pigment; (b) a solvent; and (c) a surfactant the formula:

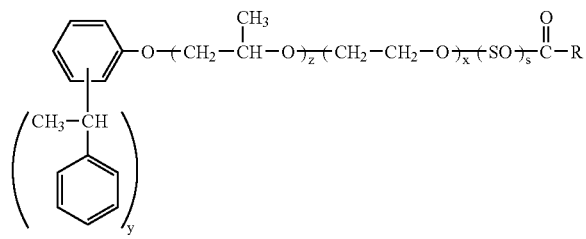

wherein SO is styrene oxide; R is a $C_8$-$C_{22}$ saturated or unsaturated group x=0-100; y=1-3; z=0-100 and s=0-100.

The present invention is also directed to a pigment dispersion comprising: (a) a pigment; (b) a solvent; (c) a polymeric resin; and (d) a surfactant the formula:

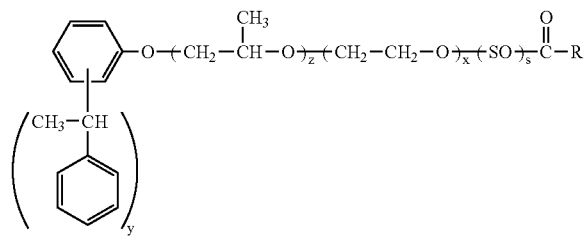

wherein SO is styrene oxide; R is a $C_8$-$C_{22}$ saturated or unsaturated group x=0-100; y=1-3; z=0-100 and s=0-100.

The invention is also directed to a pigment dispersion consisting essentially of 20% to 60% by weight of pigment, 5% to 75% by weight of an organic solvent, and 3% to 35% by weight of a pigment dispersant, said pigment dispersant being a compound of the formula

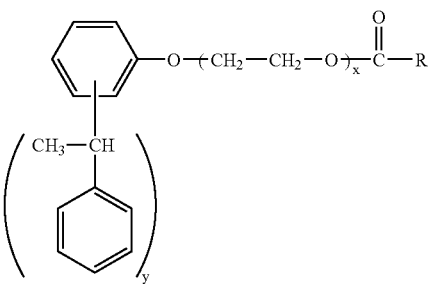

wherein R is derived from coconut fatty acid, x=9-18 and y=2-3.

The invention further provides a polymer composition comprising:

(a) a thermoplastic resin selected from the group consisting of: (i) low- or high density polyethylene, linear or branched, (ii) homo- or copolymeric polypropylenes, (iii) polyisobutylenes, (iv) copolymers of two or more of the monomers, ethylene, propylene, and butylene, (v) polyvinyl chlorides, polystyrenes, and polyolefins, optionally halogenated and optionally modified by grafting or copolymerization; polyesters, polyamides and polycarbonates, or a thermosetting resin selected from the group consisting of acrylic resins, phenolic resins, amino-plastic resins, epoxy resins, reactive resins used to produce polyurethanes, alkyd resins, and unsaturated polyester resins produced by condensation reactions of maleic anhydride with or without the presence of phthalic derivatives with an alkylene glycol or a low molecular weight polyalkylene glycol, in styrene wherewith said polyester is copolymerizable with said styrene;

(b) an additive selected from the group consisting of: (i) one or more mineral fillers, organic fillers of natural or synthetic origin or a mixture thereof wherein said one or more mineral fillers is selected from the group consisting of titanium dioxide, natural calcium carbonate, precipitated calcium carbonate, magnesium carbonate, zinc carbonate, dolomite, lime, magnesia, barium sulfate, calcium sulfate, aluminum hydroxide, magnesium hydroxide, silica, wollastonite, clays, talc, mica, solid glass spheres, hollow glass spheres, and metal oxides and wherein said organic fillers are selected from the group consisting of organic materials of natural and synthetic origin, and (ii) one or more additives selected from the group consisting of antioxidants, metal deactivators, light stabilizers, pvc stabilizers, plasticizers, lubricants, processing aids, impact modifiers, fiber reinforcements, flame retardants, antistatic agents, fluorescent whitening agents, biostabilizers, antimicrobials, chemical blowing agents, organic peroxides, nucleating agents, polymerization catalysts, grafting catalysts, thermal stabilizers, photochemical stabilizers, shrink-preventive agents, antistatic agents, mold-release agents, glass fibers, and mineral thickeners and mixtures thereof, and mixtures of (i) and (ii); and (c) a dispersant of the formula

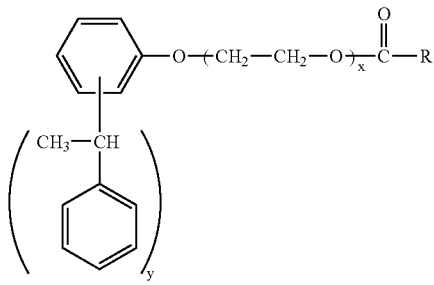

wherein R is derived from coconut fatty acid, x=9-18 and y=2-3.

The instant invention further provides a method of preparing a polymer composition comprising mixing a dispersing agent of the formula

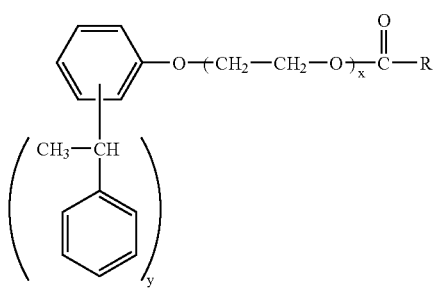

wherein R is derived from coconut fatty acid, x=9-18 and y=2-3, with a polymer and an additive selected from the group consisting of: (i) one or more mineral fillers, organic fillers of natural or synthetic origin or a mixture thereof wherein said one or more mineral fillers is selected from the group consisting of titanium dioxide, natural calcium carbonate, precipitated calcium carbonate, magnesium carbonate, zinc carbonate, dolomite, lime, magnesia, barium sulfate, calcium sulfate, aluminum hydroxide, magnesium hydroxide, silica, wollastonite, clays, talc, mica, solid glass spheres, hollow glass spheres, and metal oxides and wherein said organic fillers are selected from the group consisting of organic materials of natural and synthetic origin, and (ii) one or more additives selected from the group consisting of antioxidants, metal deactivators, light stabilizers, pvc stabilizers, plasticizers, lubricants, processing aids, impact modifiers, fiber reinforcements, flame retardants, antistatic agents, fluorescent whitening agents, biostabilizers, antimicrobials, chemical blowing agents, organic peroxides, nucleating agents, polymerization catalysts, grafting catalysts, thermal stabilizers, photochemical stabilizers, shrink-preventive agents, antistatic agents, mold-release agents, glass fibers, and mineral thickeners and mixtures thereof, and mixtures of (i) and (ii).

The invention is also directed to a polymeric composition comprising: (a) a polymer; (b) an inorganic or organic additive; and (c) a dispersant of the formula

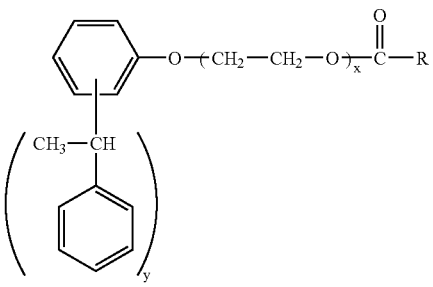

wherein R is a $C_8$-$C_{22}$ saturated or unsaturated group; x=1-100; and y=1-3.

DESCRIPTION OF THE PREFERRED EMBODIMENTS

Our invention relates to the use of $C_8$-$C_{22}$ saturated and unsaturated fatty acid esters of alkoxylated styrenated phenols as a pigment dispersant especially for non-aqueous dispersions, however also usable in aqueous dispersions.

In accordance with a preferred embodiment of the present invention, there is provided a pigment dispersion comprising a pigment, a non-aqueous solvent and a pigment dispersant of the formula

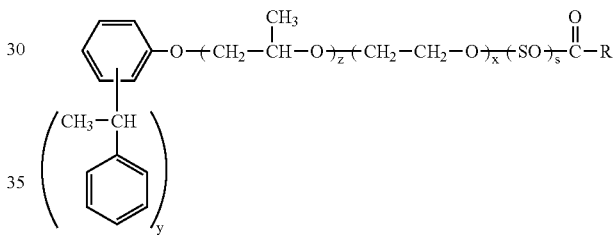

wherein SO is styrene oxide; R is a $C_8$-$C_{22}$ saturated or unsaturated group x=0-100; y=1-3; z=0-100 and s=0-100.

In a most preferred embodiment there is provided a pigment dispersion comprising 20% to 60% by weight of pigment, 5% to 75% by weight of an organic solvent, and 3% to 35% by weight of a pigment dispersant, said pigment dispersant being a compound of the formula

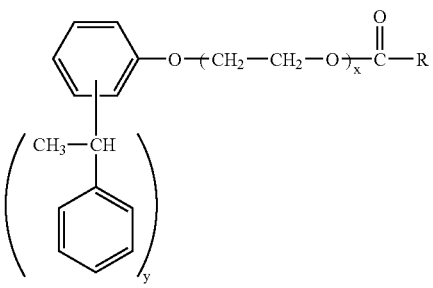

wherein R is derived from coconut fatty acid, x=9-18 and y=2-3.

In the present specification, the term "non-aqueous" denotes a composition into which no water has been specifically introduced. Due to the possibility of atmospheric water being introduced through exposure to a relatively humid environment, this term does not rule out the potential for any water to be present through such a manner. The term "liquid dispersion" is intended to encompass any composition which is present in a fluid state (i.e., possessing a viscosity of below about 10,000 centipoise at standard temperature and pressure).

The non-aqueous solvent usable in the present invention varies depending upon the use of the pigment dispersion of the present invention. For instance, examples of the non-aqueous solvent for use in paints are usual organic solvents such as esters, ethers, ketones, alcohols, and aromatic solvents. Examples of other non-aqueous solvent include the glycol ethers such as ethylene glycol monoethyl ether, diethylene glycol monoethyl ether, diethylene glycol dimethyl ether and dipropylene glycol monoethyl ether, glycol monoether acetates such as ethylene glycol monoethyl ether acetate, propylene glycol monomethyl ether acetate and diethylene glycol monoethyl ether acetate, ketones such as cyclohexanone and methyl ethyl ketone, amides such as N, N-dimethylacetamide and N-methylpyrrolidone, lactones such as .gamma.-butyrolactone, and acetic acid esters such as butyl acetate. Preferable as the non-aqueous solvent for use in printing inks, particularly offset printing inks are lipophilic solvents such as vegetable oils and mineral oils.

In applications where resins are present, plasticizers are an important component of the formulation. Examples of plasticizers that are suitable include benzyl butyl phthalate, dibutyl phthalate, triphenyl phosphate, 2-ethyl hexyl benzyl phthalate and dicyclohexyl phthalate. Other well-known plasticizers which may be employed include dinonylphthalate, diisononylphthalate, diallyl phthalate, dibenzyl phthalate, butyl cyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetyl tributyl citrate, dibenzyl sebacate, tricresyl phosphate, toluene ethyl sulfonamide, the di 2-ethylhexyl ester of hexamethylene diphthalate, and di(methylcyclohexyl) phthalate. The particular plasticizer and the amount thereof used are chosen in accordance with the demand for compatibility.

The dispersants of the present invention are manufactured by reacting a styrenated phenol alkoxylate of the formulae (i) or (ii) or (iii)

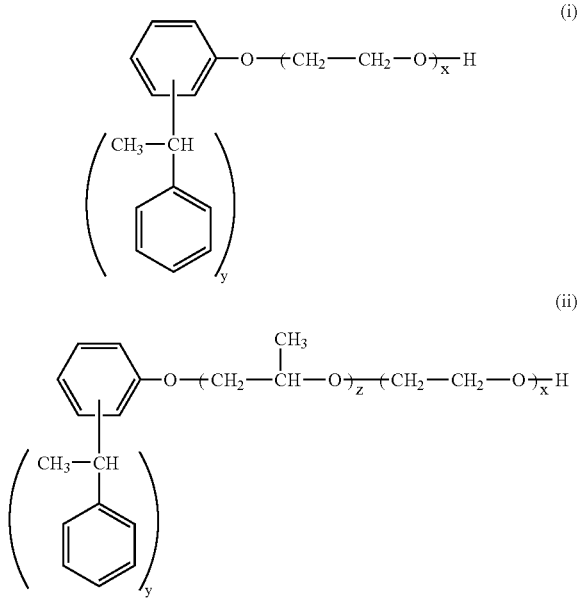

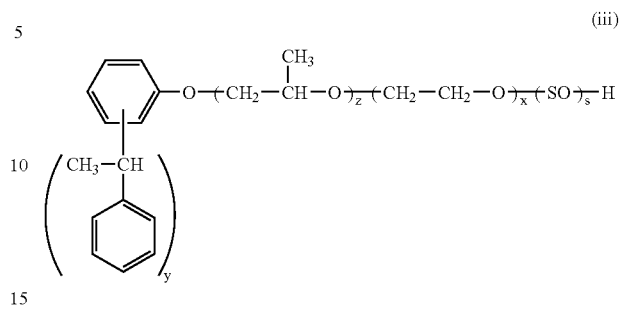

wherein x=1-100; y=1, 2, 3; z=0-100 s=0-100 with an equimolar amount of a $C_8$-$C_{22}$ saturated or unsaturated fatty acid in the presence of p-toluenesulfonic acid as a catalyst. The reaction is conducted in a suitable reactor at a temperature range of about 100°-160° C., more preferably at a temperature range of 120°-135° C. and most preferably at a temperature range of 145°-160° C.

The styrenated phenols alkoxylates are intended to include compounds having the following chemical structures:

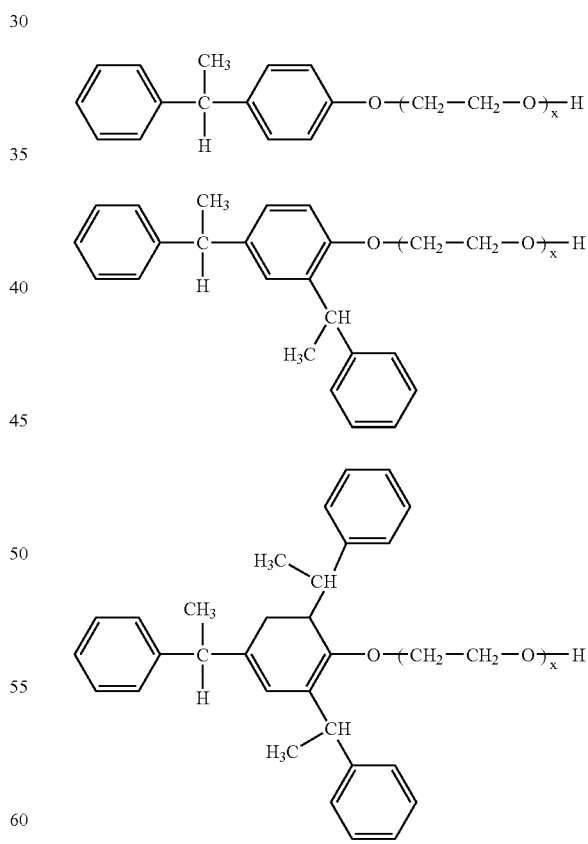

wherein x is as defined above. The propoxylated as well as the mixed product ethoxylate/propoxylate and ethoxylate/propoxylate/styroxylate are also intended to be included within the scope of the present invention.

The preferred dispersing agent/surfactant of the invention has the formula

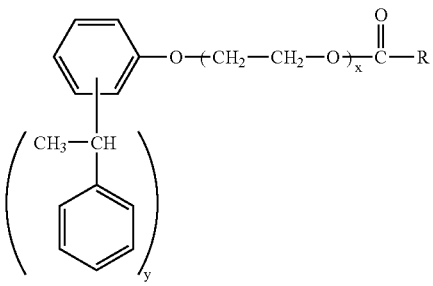

wherein R is a $C_8$-$C_{22}$ saturated or unsaturated group; x=1-100; and y=1-3. A most preferred dispersing agent has the formula

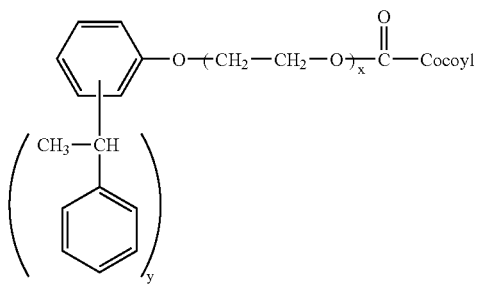

wherein y is about 2.0-2.5 and x is about 9-18.

The pigment of the dispersion of the present invention may be selected from inorganic pigments (such as carbon black pigments, e.g., furnace blacks, electrically conductive carbon black pigments, extender pigments and corrosion inhibitive pigments); organic pigments; dispersed dyes; and mixtures thereof. Examples of organic pigments that may be present in the pigment dispersion include, but are not limited to, perylenes, phthalo green, phthalo blue, nitroso pigments, manoazo pigments, diazo pigments, diazo condensation pigments, basic dye pigments, alkali blue pigments, blue lake pigments, phloxin pigments, quinacridone pigments, lake pigments of acid yellow 1 and 3, carbozole dioxazine violet pigments, alizarine lake pigments, vat pigments, phthaloxy amine pigments, carmine lake pigments, tetrachloroisoindolinone pigments and mixtures thereof. Inorganic pigments that may be present in the pigment dispersion, include, for example, titanium dioxide, electrically conductive titanium dioxide, and iron oxides, e.g., red iron oxides, yellow iron oxides, black iron oxides and transparent iron oxides. Extender pigments that may be present in the pigment dispersion include, but are not limited to, silicas, clays, alkaline earth metal sulfates and carbonates, such as calcium sulfate, magnesium sulfate, barium sulfate, and calcium carbonate. The pigment dispersion may contain corrosion inhibitive pigments, such as aluminum phosphate and calcium modified silica. Mixtures of organic and inorganic pigments are also suitable for making the dispersions of the present invention.

Pigment blacks with an average primary particle diameter of 8 to 80 nm, preferably 10 to 35 nm, and a DBP number of 40 to 200 ml/100 g, preferably 60 to 150 ml/100 g, can be used as the carbon black. In a preferred embodiment of the invention, gas blacks with an average primary particle diameter of 8 to 30 nm, preferably 10 to 25 nm, can be used.

The pigment dispersions according to the invention contain 1 to 65% by weight, preferably 30 to 50% by weight, of pigment, 2 to 35% by weight, preferably 3 to 20% by weight, of the esterified styrenated phenol alkoxylate products, 0 to 20%, preferably 0 to 5%, of additional nonionic or anionic surface-active agents, and 25 to 40% by weight of a solvent.

The amount of dispersants depends on the specific materials employed and the concentration of pigment in the dispersion required. For inorganic pigments, such as titanium dioxide and iron oxide pigment, the amount used is typically in the range 0.02 to 10%, commonly 0.05 to 5% and more usually 0.1 to 2.5%, by weight of the pigment; for organic pigments such as phthalocyanines, somewhat higher levels of dispersant may be used, typically in the range 0.02 to 50%, more usually from 0.1 to 30%, by weight of the pigment; and for carbon black the amount of dispersant is typically in the range 0.02 to 30%, more usually from 0.1 to 20%, by weight of the pigment.

When incorporated into end use products such as paints or surface coatings typical pigment levels on the final product will be from about 0.02 to about 12%, particularly about 0.1 to about 10%, pigment by weigh based on the total paint or surface coating. Where coloured inorganic pigments are used, the levels will typically be from about 0.05 to about 12%, particularly about 0.2 to about 10%, for white pigments, particularly titanium dioxide, the pigment may be present to provide opacity and not just colour and will often be present at concentrations e.g. in base paint formulations, of up to 25%, typically from 0.2 to 25%, by weight; for organic pigments, especially phthalocyanine pigments, the levels will typically be up to about 8% typically from about 0.05 to about 8%, particularly about 0.1 to about 5%; and for carbon black the levels will typically be from about 0.05 to about 8%, particularly about 0.2 to about 5%.

The non-aqueous pigment dispersion composition of the present invention is prepared by adding a pigment to a non-aqueous solution of a pigment dispersant, disaggregating and dispersing the pigment in the solution by means of a dispersing machine such as roll mill, ball mill or sand mill, diluting the resultant dispersion to a desired concentration and removing larger particles therefrom by way of centrifugation, Scharples-type centrifugation and filtration. If a desired particle-size distribution cannot be obtained by the first particle classification process, the dispersing process and particle classification process are repeated until the desired particle-size distribution is obtained. In most instances, if the proportion of particles impassable through a sieve having a mesh size of 300 nm is not greater than 30%, there is no need for particle classification. Thus, the pigment contained in the dispersion has a median particle size of not greater than 250 nm, preferably not greater than 200 nm with not greater than 30% of the pigment particles being impassable through the sieve having a mesh size of 300 nm.

Also, the pigment dispersion according to the invention can be produced by first preparing a pigment-free mixture of the surface-active compounds, the non-aqueous solvent, the antifoaming agents and any other additives, and subsequently adding the pigment portion which is dispersed in the mixture. The dispersion can be carried out by means of a dissolver or grinder, for instance a ball grinder or roller mill.

The dispersion of the invention is preferably storage stable. By this term, it is intended that the inventive dispersion will remain in a fluid state with substantially no precipitation or reagglomeration of pigment for at least 60 days while being continuously exposed to a temperature of at least 50° C. Such a test is one manner of reproducing long-term storage conditions and thus is not intended as being the sole limitation of temperature within this invention. One of ordinary skill in this art would appreciate the need to provide a modified test of this nature. Thus, the inventive dispersions must merely exhibit substantially no precipitation and retention of its fluid state (low viscosity) after exposure to high temperature storage for 60 days.

The pigment dispersions according to the invention can be employed for all purposes and are excellently suitable for the production of emulsion paints based on polyvinyl acetate, polyvinyl acetate copolymers, styrene-butadiene copolymers, polyvinyl propionates, acrylic and methacrylic acid ester polymers, saponified alkyd resins and oil emulsions; for the production of wallpaper paints based on cellulose derivatives such as methylcellulose, hydroxymethylcellulose and carboxymethylcellulose, and for the production of printing inks which contain, as binders, mainly saponified natural resins, such as shellac, saponified water-soluble synthetic resins or acrylate binder solutions.

The dispersant of the invention find uses in many applications. In many applications it dispersed pigment, polymer, plasticizer, and plastizols. In both applications, lower viscosity and higher color yield for the pigment resulted. When lower viscosity is achieved, it allows either increased shear of the particulate matter added, be it pigment or dyes. In the case of pigment, this offers increase color strength; thus, saving money for the end user. The dispersant of the invention does not coalesce the polymer, but lowers the particle size of it, which makes for a more efficient coating. This offers what is known as 'plate out' prevention with injection plastizol machines.

The dispersants of the invention also work with Pigment Red 57:1, diiso nonyl phthalate, and florescent pigments, which are made with formaldehyde resins, benzoquinoneimines, and melamine formaldehyde. They are essentially dyed polymers. The also work with any oil, or liquid plastic (plastizol) dispersion, where water is not present, and pigment, dye, or any particulate matter has to be dispersed. This includes inks, paints, any coating. Possibilities are solvent-borne resins, which include Alkyds, Alkyd Copolymers, Oil Modified Urethanes (OMU), Polyesters and Solution Acrylics.

Although Applicant does not wish to be bound by theoretical explanations of interfacial phenomena, it is believed that the dispersant of the invention works by drastically lowering the interfacial tension of the polymer/plasticizer and the pigment. When shear is applied, the polymer/plasticizer and pigment breaks into smaller particles. Since the dispersant of the invention has a high affinity for low HLB type polymers, steric hindrance takes place to keep the particles evenly spaced in a lower energy state. This allows for further development of the pigment color using the conventional dispersing equipment. After a lower viscosity is attained, many options exist for the user. Higher solids can be gained on pigment, resin, or plasticizer, not to mention the possible increase in color yield.

In another preferred embodiment of the invention, additives useful for making synthetic resin products are dispersed into the resins using the dispersant of the present invention. The dispersant of the invention may be added or injected directly into a polymer melt or into a polymer solution using a solvent. The dispersant is added in the range of 0.01% to 20% by weight of the resin and the additive is present in the range of 0.01% to 30% by weight.

The additives that can be added to the resins are selected from the group consisting of (i) one or more mineral fillers, organic fillers of natural or synthetic origin or a mixture thereof wherein said one or more mineral fillers is selected from the group consisting of titanium dioxide, natural calcium carbonate, precipitated calcium carbonate, magnesium carbonate, zinc carbonate, dolomite, lime, magnesia, barium sulfate, calcium sulfate, aluminum hydroxide, magnesium hydroxide, silica, wollastonite, clays, talc, mica, solid glass spheres, hollow glass spheres, and metal oxides and wherein said organic fillers are selected from the group consisting of organic materials of natural and synthetic origin, and (ii) one or more additives selected from the group consisting of antioxidants, metal deactivators, light stabilizers, pvc stabilizers, plasticizers, lubricants, processing aids, impact modifiers, fiber reinforcements, flame retardants, antistatic agents, fluorescent whitening agents, biostabilizers, antimicrobials, chemical blowing agents, organic peroxides, nucleating agents, polymerization catalysts, grafting catalysts, thermal stabilizers, photochemical stabilizers, shrink-preventive agents, antistatic agents, mold-release agents, glass fibers, and mineral thickeners and mixtures thereof, and mixtures of (i) and (ii).

The thermal stabilizing agent is an antioxidant and is selected from the group consisting of: tetrakis[methylene 3-(3',5'-di-tert-butyl-4'-hydroxyphenyl)-propionate]-methane, octadecyl 3-(3',5'-di-tert-butyl-4-hydroxyphenyl)propionate, 1,3,5-trimethyl-2,4,6-tris-(3,5-di-tert-butyl)-4-(hydroxyl-benzyl)benzene, bis(2,4-di-tert-butyl-phenyl) pentaerythritol diphosphite, tris(mono-nonyl-phenyl) phosphite, 4,4'-butylidene-bis(5-methyl-2-tert-butyl)phenol, tris(3,5-di-tert-butyl-4-hydroxybenzyl)isocyanurate, tris-nonylphenyl phosphite, distearyl pentaerythritol diphosphite, tetrakis-(2,4-di-tert-butylphenyl)-4,4'-biphenylene diphosphonite, tris-(2,3-di-tert-butylphenyl)-phosphite, butylated hydroxy toluene, dicetyl thiodipropionate, dimyristyl thiodipropionate, and poly(1,4-cyclohexylene-3,3'-thiodipropionate, partially terminated with stearyl alcohol, as well as mixtures of any two or more thereof.

Typical antistatic agents are selected from the group consisting of glycerol monostearates, ethoxylated amines, polyethylene glycols, and quaternary ammonium compounds, as well as mixtures of any two or more thereof.

The coupling agents are selected from the group consisting of silanes titanates, chromium complexes, carboxyl-substituted polyolefins, carboxyl-substituted acrylates, and paraffins, as well as mixtures of any two or more thereof.

The UV stabilizers are selected from the group consisting of: 2-hydroxy-4-octoxybenzophenone, 2-hydroxy-4-isooctoxy-benzophenone, 4-hydroxy-4-n-dodecycloxybenzophenone, 2-(3-di-tert-butyl-2-hydroxy-5-methylphenyl-5-chlorobenzyltriazole, 2-(2-hydroxy-3,5-di-tert-amylphenyl)-benzotri-azole, para-tert-butylphenyl salicylate, 2,4-di-tert-butylphenyl-3,5-di-tert-butyl-4-hydro-xybenzoate, nickel bis-ortho-ethyl(3,5-di-tert-butyl-4-hydroxybenzyl) phosphonate, and 2,2',6,6'-tetramethyl-4-piperidinyl sebacate, as well as mixtures of any two or more thereof.

The flame retardant is selected from the group consisting of: decabromodiphenyl oxide, dodecachlorodimethane dibenzocyclooctane, ethylene bis-dibromo norbornane dicarboxamide, ethylene bis-tetra-bromophthalimide, and antimony trioxide, as well as mixtures of any two or more thereof.

The metal deactivating agent is selected from the group consisting of: oxalyl bis-(benzylidene hydrazide), and 2,2'-oxamido bis-(ethyl 3-(3,5-di-tert-butyl-4-hydroxyphenyl) propionate, as well as mixtures of any two or more thereof.

The nucleating agent is selected from the group consisting of sodium benzoate, diphenyl phosphinic acid, the magnesium, sodium, calcium, and aluminum salts of diphenyl phosphinic acid, phenyl phosphinic acid, the magnesium, sodium, calcium, and aluminum salts of phenyl phosphinic acid, phenyl phosphorous acid, and the magnesium, sodium, calcium, and aluminum salts of phenyl phosphorous acid, as well as mixtures of any two or more thereof.

The resins are selected from the group consisting of: (a) a thermoplastic resin selected from the group consisting of: (i) low- or high density polyethylene, linear or branched, (ii) homo- or copolymeric polypropylenes, (iii) polyisobutylenes, (iv) copolymers of two or more of the monomers, ethylene, propylene, and butylene, (v) polyvinyl chlorides, polystyrenes, and polyolefins, optionally halogenated and optionally modified by grafting or copolymerization; polyesters, polyamides, polyolefins and polycarbonates, or a thermosetting resin selected from the group consisting of acrylic resins, phenolic resins, amino-plastic resins, epoxy resins, reactive resins used to produce polyurethanes, alkyd resins, and unsaturated polyester resins produced by condensation reactions of maleic anhydride with or without the presence of phthalic derivatives with an alkylene glycol or a low molecular weight polyalkylene glycol, in styrene wherewith said polyester is copolymerizable with said styrene.

The method of manufacturing filled polymer compounds which are preferably flowable and homogeneous (i.e., well mixed) according to the invention, is characterized in that the inventive dispersing agent is added to the mineral and/or organic fillers prior to their introduction to the resin, or to the resin prior to or after the introduction of said fillers to the resin.

The polymer compositions of the invention may be employed in any method of forming or processing of thermoplastics, such as extrusion, injection molding, calendering, etc.

EXAMPLES

The present invention is illustrated by the following Examples, but should not be construed to be limited thereto. In the Examples, "part" and "%" are all part by weight or % by weight unless specified otherwise.

The starting material for making the preferred esterified surfactants is a styrenated phenol ethoxylate having the following chemical structure:

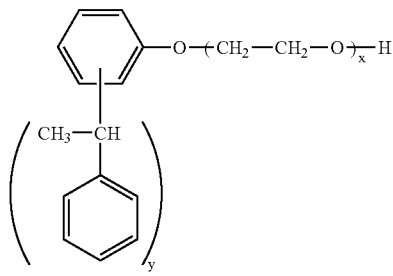

wherein y is about 2.0-2.5, x is about 9-18. The above material is sold by Ethox Chemicals under the designation Ethox 2938.

The product is used around 3%-9%, based on 100% theoretical yield of pigment in an non-aqueous dispersion, by weight. That is, for a 35% active pigment dispersion, use roughly 4% dispersant. The product has been successfully used in acrylic latex, styrene acrylic latexes, as an emulsifier, and UV absorbers for the textile industry. It is also useful for making dispersions of kaolin clays and inorganic pigments, and as a dispersant for magnetic tape media, and as a vermiculite dispersant for polyester film. The dispersant also affects the rheological properties of the Joncryl Polymers from Johnson, thus lessening their usage rate, but allowing the same adhesion. The dispersant of the invention lowers the particle size of the pigment or particle, while retarding re-agglomeration, which inturn promotes a lower viscosity with increased stability The product offers shorter milling times and may allow for the use of cheaper less refined pigments.

The following Examples are illustrative of the invention.

Example 1

The amount of components as outlined below are used in the preparation of a coconut fatty acid ester x=9-18 and and y=2.0-2.3.

| COMPONENT | AMOUNT |
|---|---|
| Ethox 2938 (anhydrous) | 161.3 g |
| p-toluenesulfonic acid | 0.5 g |
| Coconut fatty acid | 35 g |

To a clean reactor, charge about 165 grams of the ETHOX 2938 so that after drying there will be approximately 161.3 lbs. of anhydrous material. Dry with $N_2$ and heat to 110-120° C. to a water content % $H_2O$<0.1%. When dry, cool to 80° C. Then add 35 g of p-toluenesulfonic acid and 0.5 g of coconut fatty acid and heat at 135-155° C. The reaction takes 20-28 hours and a product of the formula

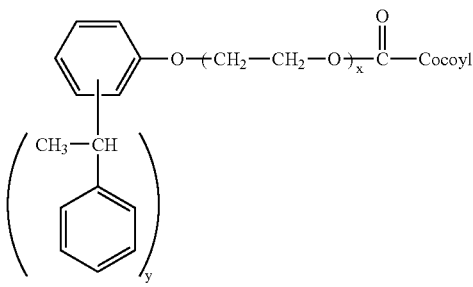

wherein y is about 2.0-2.5, x is about 9-18.

Example 2

The following components are reacted using the procedure of Example 1.

| COMPONENT | AMOUNT |
|---|---|
| Ethox 2938 (anhydrous) | 82 g |
| p-toluenesulfonic acid | 0.25 g |
| Coconut fatty acid | 18 g |

The resulting product is a pale yellow liquid.

Example 3

The following components are reacted using the procedure of Example 1.

| COMPONENT | AMOUNT |
| --- | --- |
| Ethox 2938 (anhydrous) | 1610.3 g |
| p-toluenesulfonic acid | 5 g |
| Coconut fatty acid | 350 g |

Example 4

The following components are reacted using the procedure of Example 1.

| COMPONENT | AMOUNT | |
| --- | --- | --- |
| Ethox 2938 (anhydrous) | | 805 g |
| p-toluenesulfonic acid | | 2.5 g |
| Coconut fatty acid | | 175 g |
| Dimethylformamide | 736 | 39.4642 |
| | 1864.98 | 100.0000% |

Example 5

In the present example, a polymer and a plasticizer, were added to a Cowles dissolver, and the dispersant of Example 1 was added up to 4% on the total weight of the formulation, which becomes 35% Yellow 14 pigment, 4% dispersant of Example 1, and 61% di iso nonyl phthalate. Shearing is begun, and after as much as fifteen minutes a noticeable drop in viscosity occurs. At this point, pigment can be added slowly as shear is applied until the desired loading or viscosity is attained or for more color development this can be taken to a media mill, such as a Hoover or and Eiger Mill.

Example 6

A plastizol was added to a Cowles dissolver, and the dispersant of Example 1 was added up to 4% on the total weight of the formulation, which becomes 35% Yellow 14 pigment, 4% Example 1 dispersant, and 61% plastisol. Shearing is begun, and after as much as fifteen minutes a noticeable drop in viscosity occurs. At this point, pigment can be added slowly as shear is applied until the desired loading or viscosity is attained or for more color development this can be taken to a media mill, such as a Hoover or and Eiger Mill.

Example 7

A mixture consisting of 11.1 kg of 1% strength aqueous ammonia, 18.0 kg of titanium dioxide pigment (rutile type) 15.0 kg of barium sulphate pigment, 10.5 kg of ground dolomite, 2.0 kg of talc, 0.3 kg of high-molecular silica for preventing the pigment from settling out in the paste, 0.1 kg of a commercially available preservative, 0.2 kg of sodium hexamethaphosphate, 0.3 kg of a commercially available antifoaming mixture, 0.5 kg of a nonionic emulsifier and 5.0 kg of a 3% strength aqueous solution of hydroxyethylcellulose is homogenised by means of a high-speed stirrer. It is then ground on a single-roll mill and 37 kg of an acrylic resin dispersion are added, while stirring vigorously.

A paint which is stable against flocculation is obtained by stirring 100 g of this white emulsion paint with 0.1 to 10 g of a pigment preparation produced in accordance with Example 5. When this paint is spread on paper with a 0.09 mm doctor blade, a distinctly greater depth of colour is obtained, compared with analogous emulsion paints.

Example 8

200 g of an unsaturated polyester resin polymerizable at low temperature (Palatal® P4, marketed by BASF) is introduced without stirring into a metal pot of capacity c. 500 mL which is equipped with a Pendraulik® laboratory stirrer having a vane of 5 cm diameter. Then 6 g of the dispersing agent OF Example 1 being tested is introduced. The stirrer is then run 30 sec to thoroughly intermix the contents. Then 600 g natural calcium carbonate (Millicarb®, marketed by the firm Omya S.A.) is added over 10 min, under stirring. The stirring is continued an additional 5 min. After the 15 min total mixing time, a sample of the polymer compound is conditioned at 30° C. for 2 hr, and another sample for 24 hr, following which the respective Brookfield viscosities are measured at 30° C. with the aid of a type HBT Brookfield viscosimeter, at different shear rates (5 rpm, 10 rpm, 20 rpm, and 50 rpm).

Example 9

A composition is prepared by introducing 600 g natural calcium carbonate (Millicarb, marketed by the firm Omya S.A.) into a Z-arm "Guittard" mixer preheated to 200° C., followed by addition of 6 g of the dispersant of Example 1 being tested. After mixing the filler (with or without dispersant) at 12 rpm for 15 min, 400 g polystyrene (Lacqrene® 7240 grade 4, marketed by the firm Atochem), 1.0 g of a stabilizer (Irganox® 1010, marketed by Ciba-Geigy), and 6 g of the dispersant being tested (if not added previously to the charge), are introduced to the chamber of the mixer. Mixing is carried out 10 min at 12 rpm, followed by gradual increases of the mixer speed to 47 rpm over 10 min, and then to 76 rpm over another 10 min.

Example 10

A master batch is prepared by introducing 600 g magnesium hydroxide filler (Magnifing H5, marketed by the firm Martinswerke) into a Z-arm "Guittard" mixer preheated to 230° C., mixing the filler 15 min at 12 rpm, and introducing 400 g polypropylene (Laqtene® 3120 MN1, marketed by the firm Appryl) to the mixer chamber, along with 1.0 g of a stabilizer (Irganox® 1010, marketed by Ciba-Geigy) and 6 g of the dispersant of Example 1. Mixing is carried out 10 min at 12 rpm, followed by gradual increases of the mixer speed to 47 rpm over 10 min, and then to 76 rpm over another 5 min.

Example 11

160 g of a dioctyl phthalate plasticizer is introduced without stirring into a metal pot of capacity of 1000 mL which is equipped with a top-mounted Pendraulikt laboratory stirrer having a vane of diameter 7.5 cm. Then 2 g of a stabilizer based on barium and zinc and 2 g of the dispersant of Example 1 are introduced. The mixture is mixed thoroughly for 30 sec using the stirrer, following which 200 g of a PVC (PB 1302, marketed by the firm Atochem) and 200 g natural calcium carbonate (Millicarb®, marketed by the firm Omya S.A.) are added over a period of 10 min, under stirring. Stirring is continued for an additional 16 min. A sample of the polymer compound is conditioned at 23° C. for 2 hr, and another sample for 24 hr, following which the respective Brookfield viscosities are measured at 23° C. with the aid of a type HBT Brookfield viscosimeter, at different shear rates (5 rpm, 10 rpm, 20 rpm, 50 rpm, and 100 rpm).

Example 12

A master batch is prepared by introducing 500 g TiO$_2$ filler into a Z-arm "Guittard" mixer preheated to 250° C., mixing the filler 15 min at 12 rpm, and introducing 400 g polypropylene (Laqtene® 3120 MN1, marketed by the firm Appryl) to the mixer chamber, along with 1.0 g of a stabilizer (Irganox® 1010, marketed by Ciba-Geigy) and 6 g of the dispersant of Example 1. Mixing is carried out 10 min at 12 rpm, followed by gradual increases of the mixer speed to 47 rpm over 10 min, and then to 76 rpm over another 5 min.

Example 13

A master batch is prepared by introducing 100 g decabromodiphenyl ether flame retardant into a Z-arm "Guittard" mixer preheated to 200° C., mixing the filler 15 min at 12 rpm, and introducing 400 g polyethylene terephthalate to the mixer chamber, and 4 g of the dispersant of Example 1. Mixing is carried out 10 min at 12 rpm, followed by gradual increases of the mixer speed to 47 rpm over 10 min, and then to 76 rpm over another 5 min.

Although the present invention has been described with reference to specific details of certain embodiments thereof, it is not intended that such detail should be regarded as limitations upon the scope of the invention, except as and to the extent that they are included in the accompanying claims.

The invention claimed is:

1. A pigment dispersion comprising:
   (a) a pigment;
   (b) a solvent; and
   (c) a dispersing surfactant of the formula:

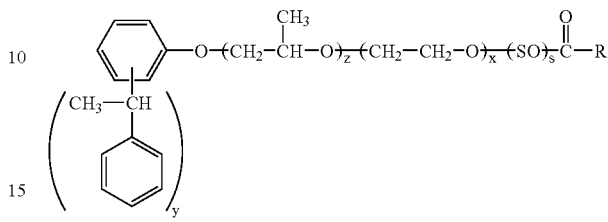

wherein SO is styrene oxide; R is a $C_8$-$C_{22}$ saturated or unsaturated group; x=0-100; y=1-3; z=0-100 and s=0-100.

2. The pigment dispersion of claim 1 wherein said pigment is an inorganic pigment.

3. The pigment dispersion of claim 1 wherein said pigment is an organic pigment.

4. The pigment dispersion of claim 1 wherein said dispersion further contains a polymeric resin.

5. The pigment dispersion of claim 1 wherein x=8-20; and y=2-3.

6. The pigment dispersion of claim 5 wherein x=12-18.

7. The pigment dispersion of claim 6 wherein x=15-18.

8. The pigment dispersion of claim 7 wherein R is the radical derived from lauric acid.

9. The pigment dispersion of claim 7 wherein R is the radical derived from oleic acid.

10. The pigment dispersion of claim 7 wherein R is the radical derived from coconut fatty acid.

* * * * *